UNITED STATES PATENT OFFICE.

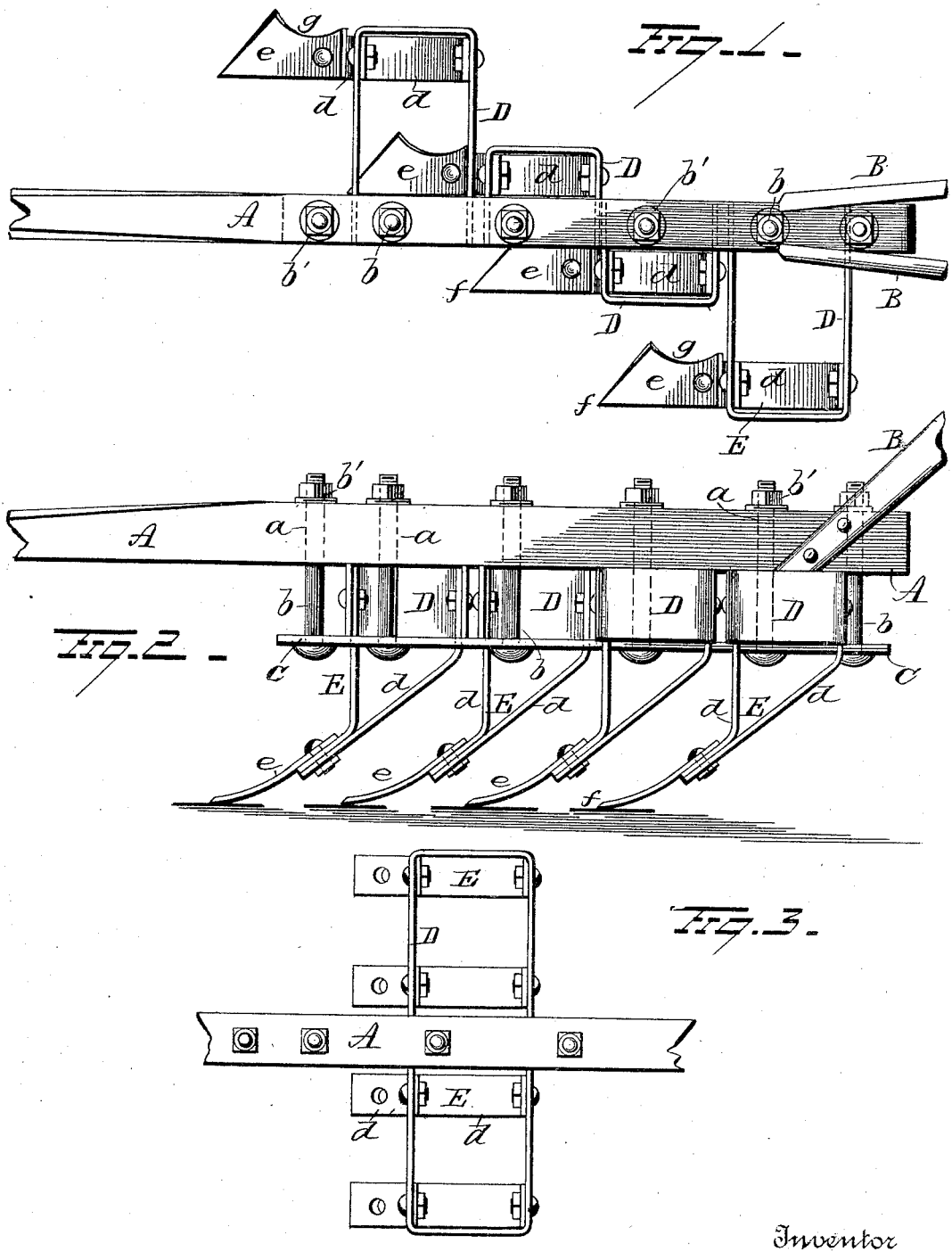

BANNISTER BOLDON LEWIS, OF MERIDIAN, MISSISSIPPI.

CULTIVATOR.

SPECIFICATION forming part of Letters Patent No. 458,586, dated September 1, 1891.

Application filed June 2, 1891. Serial No. 394,866. (No model.)

*To all whom it may concern:*

Be it known that I, BANNISTER BOLDON LEWIS, a citizen of Meridian, in the county of Lauderdale and State of Mississippi, have invented certain new and useful Improvements in Cultivators; and I do hereby declare the following to be a full, clear, and exact description of the invention, such as will enable others skilled in the art to which it appertains to make and use the same.

My invention relates to an improvement in cultivators, its object being to construct a cultivator in such manner that any desired number of shovels may be employed at will.

A further object is to so construct a cultivator that any desired number of shovels may be used at will and said shovels made adjustable laterally.

A further object is to so construct and arrange the several parts of a cultivator that the shovels may be arranged in a line, or arranged one in rear of the other, or in any other preferred manner, and to so construct the device that these objects may be accomplished by the operator quickly and easily.

With these objects in view the invention consists in the combination, with a beam and a plate adapted to run parallel therewith, of a series of frames located between said beam and plate and shovels carried by said frames; and the invention also consists in certain novel features of construction and combinations and arrangements of parts, as hereinafter set forth, and pointed out in the claims.

In the accompanying drawings, Figure 1 is a plan view of the device. Fig. 2 is a side elevation. Fig. 3 is a view showing a different arrangement of shovels.

A represents the beam of the cultivator, provided at its rear end with handles B. The beam A is provided with a series of perforations $a$ for the accommodation of a series of bolts $b$, which pass through them, said bolts being screw-threaded at their upper ends for the reception of nuts $b'$. The lower ends of the bolts $b$ are provided with heads, and said bolts are adapted to pass through and support a plate C, which extends parallel with the beam A. Located between the beam A and plate C is a series of frames D, said frames being open at one end, so that they may be inserted between the beam and plate without conflict with the bolts $b$. Secured to the inner and outer faces of each frame D is a bracket or stock E, each bracket or stock preferably comprising two depending plates or bars $d$. Secured to the lower end of each stock $d$ is a shovel $e$, each shovel being made with a beveled end to produce a point $f$, and a curved inner edge $g$.

The frames D will be made of varying lengths, and may be disposed as shown in Fig. 1, or, if desired, all the shovels may be arranged at one side of the beam, or one or more of said shovels may be employed at will, or all the shovels may be arranged in one line, as shown in Fig. 3. A cultivator thus constructed is very simple, is easy to manipulate, may be readily and quickly changed into various forms of cultivator, and the device will be effectual in the performance of its functions.

Having fully described my invention, what I claim as new, and desire to secure by Letters Patent, is—

1. In a cultivator, the combination, with a beam and a plate arranged parallel therewith and connected thereto, of a series of frames located between said beam and plate, and shovels carried by said frames, substantially as set forth.

2. In a cultivator, the combination, with a beam and a plate arranged parallel therewith and connected thereto by bolts, of a series of frames of varying lengths located between said beam and plate and adapted to project laterally therefrom, and a shovel carried by each frame, substantially as set forth.

3. In a cultivator, the combination, with a beam and a plate arranged parallel therewith and connected thereto by bolts, of a series of frames located between the beam and plate, a stock secured to each frame, and a shovel carried by each stock, substantially as set forth.

In testimony whereof I have signed this specification in the presence of two subscribing witnesses.

BANNISTER BOLDON LEWIS.

Witnesses:
R. J. McCAUGHEY,
R. H. BOURDEAUX.